April 6, 1965   M. KRAMCSAK, JR., ETAL   3,176,340
CASTER DEVICE
Filed Dec. 28, 1961

INVENTORS
Michael Kramcsak Jr.
Robert E. Sheahan

By A. G. Douras.
Attorney

United States Patent Office 3,176,340
Patented Apr. 6, 1965

3,176,340
CASTER DEVICE
Michael Kramcsak, Jr., Bridgeport, and Robert E. Sheahan, Woodbridge, Conn., assignors to Stewart-Warner Corporation, a corporation of Virginia
Filed Dec. 28, 1961, Ser. No. 162,835
1 Claim. (Cl. 16—18)

This invention relates to a caster device having interconnected complementary shell portions one of which rolls along the supporting floor surface on a rotational axis inclined with respect to the floor surface, and in particular, to improved disposition of the shell portions and structural arrangement therefor operable for mounting them together.

For both aesthetic and practical reasons there is a strong trend to use caster devices having opposing shell portions mounted to rotate relative to one another on an inclined axis, with one of the portions being pivotally connected to the supported article of furniture while the other of the portions rides on the floor surface. The smooth curves of the exterior shell is both pleasing to the eye and decorative; while the inclined rotational axis renders efficient operation commonly associated with the creeper-type caster. Patents disclosing casters of such types are: 2,484,189 to G. F. Shepherd; and 2,631,328 to M. Kramcsak, Jr.

In casters of the subject type, it is desirable that the shell portions be economically fabricated and easily assembled or interconnected, while being freely rotatable relative to one another. Particular problems are encountered here, however, since the axle is generally supported as a cantilever in the opposing shell portions and the offset application of forces from the shell portions creates a large bending moment at the connection of the axle to each shell.

In prior connections of the separate shell portions, it was common to require separate fabrication and/or separate structural components. Thus, for example, the axle of the unit would be cast integrally with one of the shell portions when the shell portion was cast. An alternate structure included having a separate frame independent of the shell portion, which supported the axle, the shell being merely a dummy bolted to and covering the frame. In both of these arrangements, costly or additional fabrication steps or separate parts were required to render the assembly operable. This invention minimizes production costs to render an operative caster of very economical means.

Accordingly, an object of this invention is to provide a caster having a pair of complementary shell portions with an improved mounting arrangement between the shell portions to eliminate costly extra fabrication steps thereto or separate components therein.

Another object of this invention is to provide a caster having opposing complementary shell portions wherein the axle interconnecting the portions is press-fitted or frictionally held in one of the shell portions.

Another object of this invention is to provide a caster of the ball type wherein the shell portions are disposed relative to one another with the rotational axis being inclined with respect to the supporting floor surface at an angle in the order of 20°.

These and other objects of the invention will be more fully understood and appreciated after a complete disclosure of the invention contained in the following specification, the drawing forming a part thereof wherein.

Figure 1:
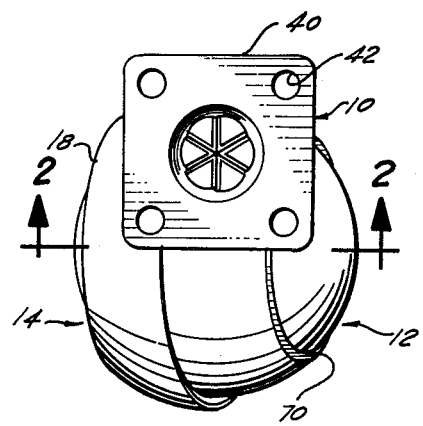
FIG. 1 is a top plan view of a ball caster having therein an embodiment of the subject invention.
Figure 3:
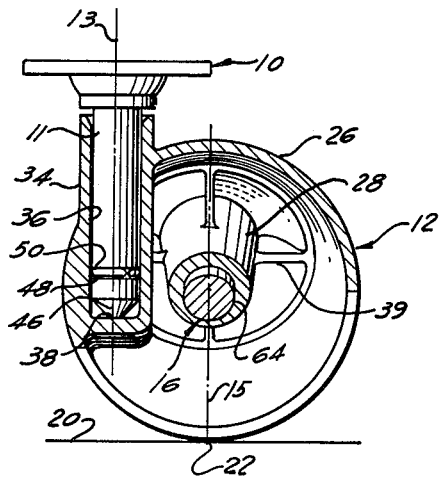
FIG. 3 is a section view as seen from line 3—3 of FIG. 2.
Figure 2:
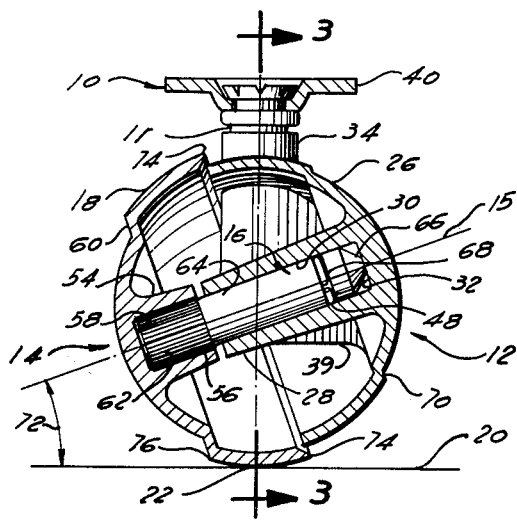
FIG. 2 is a section view as seen from line 2—2 of FIG. 1.

Referring now to FIGS. 1, 2 and 3, a ball caster is shown and includes bracket support 10 adapted for connection to the supported article of furniture (not shown) and having a pivot stem 11, shell 12 connected to the stem 11 to pivot about the pivotal axis 13 defined thereby, and shell 14 supported by axle 16 to rotate relative to the shell 12 about rotational axle 15 defined by the axle 16. Thus the bracket support 10 secured to the article of furniture (not shown) supports the fixed shell 12 for pivoting about pivotal axis 13 generally normal to supporting surface 20, and the rotatable shell 14 is rotatable about rotational axis 15 inclined at an angle with respect to the pivotal axis 13 and supporting surface 20. The rotatable shell 14 includes a generally circumferential arcuate surface 18 adapted to engage the supporting floor surface 20 as indicated at 22.

Referring now more in detail to the specific construction of the ball caster, shell portion 12 includes a wall 26 defining a substantially hemispherical outside contour. Hub 28 projects inwardly from the shell wall 26 diametrically from its pole. The hub 28 defines a bore 30 of uniform circular cross-section terminating at abutment 32. Socket 34 is spaced laterally from the hub 28 and defines a chordal bore 36 of uniform circular cross-section terminating at abutment 38. Ribs 39 brace the hub 28 and socket 34 rigidly to the wall 26.

Figure 4:
FIG. 4 is a plan view of a split ring used in the ball caster of the subject invention.

Bracket support 10 includes a top plate 40 having holes 42 therein adapted for ready connection (as by screws, not shown) to the supported article of furniture (not shown). Stem 11 projects from the top portion 40 and defines at its remote end a tapered bearing 46 of reduced cross-section. The stem 11 is mateably received in the bore 36 of socket 34 with the bearing 46 resting on abutment 38. A slip ring 48 (FIG. 4) received in recess 50 on the stem 11 frictionally engages the periphery of the bore 36 to maintain the stem within the socket.

The rotatable shell portion 14 includes a wall 52 of generally hemispherical outside contour having a hub 54 projecting inwardly therefrom diametrically of its pole. Hub 54 defines therein a bore 56 of uniform circular cross-section terminating at abutment 58. A raised treaed portion 60 extends circumferentailly of the wall 52 symmetrically of a plane extending normal to the axis of bore 56 and provides the floor engaging surface 18, previously mentioned.

Axle 16 is formed from a stub shaft having one end knurled as at 62 and having its other end of smooth cylindrical section 64 terminating at a tapered bearing 66. The knurled section 62 is adapted to be press-fitted into a snug friction fit within the bore 56 of hub 54 of shell 14. The smooth cylindrical section 64 is adapted to be received freely within the bore 30 of hub 28 of the shell 12, the bearing 66 riding on abutment 32 therein. A slip ring 48 is received within recess 68 on the cylindrical section 64 operable to maintain the axle secured within the hub 28.

A portion of the fixed shell 12 adjacent the raised tread portion 60 of the rotatable shell 14 is raised as indicated at 70 to present an appearance approximating a sphere having symmetrically raised circumferential portions.

It will be appreciated that a load acting on the top plate 40 is supported by the caster device through the interaction of the various parts and ultimately resisted by the supporting floor 20. The offset cantilever connection (as seen in FIG. 2) of the axle 16 to the various shell portions 12 and 14 causes a couple or static bending moment to be exerted on the axle by and between the hubs of the respective shell portions. Thus the axle 16 is subjected at knurled portion 62 within bore 56 of hub 54 to a couple or bending moment tending to dislodge the axle from the hub.

The transverse component of the caster force on the axle, which causes the bending moment, is generally proportional to the cosine of the angle of inclination 72 of the rotational axis 15 with respect to the supporting floor surface 20. Similarly the effective moment arm or offset of the secured axle in the shell portion from the contact is decreased with increased angle of inclination 72. Thus as the angle of inclination 72 increases, the bending moment acting on the axle decreases.

While an increased angle of inclination does decrease the static bending moment on the axle, it, however, also presents other problems which similarly must be overcome. The axial force on the axle or the thrust which the shells must support increases. Movement of the caster along a given path should cause the rotatable shell portion to roll on the supporting surface, not partially roll and partially slide. Increased angle of inclination 72 increases the tendency of the floor engaging shell to follow a rotatable path other than the actually traced path, thus increasing the tendency to slide. Thus the offset of the contact point from the pivot axis 13 (as seen in FIG. 3) must be increased to counteract the sliding tendency. This causes increased forces on the structure which is likely to cause failure.

It has been found that by increasing the angle of inclination 72 to approximately 20° the various forces acting on the axle have been proportioned in a manner to permit the structure as herein disclosed.

Axle 16 is thus secured within the rotatable shell 14 by means of a press-fit or friction-fit. This can be achieved with limited cost since the shell portions can be made of generally inexpensive castings lacking complicated contours or close tolerances. The press-fitting operation is exceedingly simple requiring little extra effort, equipment or components. The axle 16 can be knurled at 62 as above indicated to ensure positive retention thereof within hub 54 and to prevent rotation of the axle relative to the hub. Interlocking of the freely rotatable cylindrical end 64 of the axle in shell 12 is now possible by means of a slip ring 48 since the increased axial component on the axle 16 maintains the axle in snug fit against abutment 32.

It is also noted that with the subject caster device the exterior portion of the shells 12 and 14 do not evidence locking means such as pins, holes or screws, but present an unmarred exterior surface. The tread width 60 can be increased to reduce localized contact pressures and yet maintain the clearance necessary between the edge 74 of the tread and the bracket connection 10. The arcuate curvature of the wider tread portion 60 can provide contact point 22 centrally of the tread portion and maintain opposite edges 74 and 76 considerably elevated above the contact point to prevent jamming or snarling of a soft pile carpet fabric between the shells. Similarly, the raised portion 70 of the stationary shell 12 further decreases the possibility of snarling the rug pile as above described.

While a single embodiment has been shown it will be obvious to those skilled in the art that various modifications can be made therein without departing from the concept of the invention. It is accordingly desired that the invention not be limited by the disclosure but by the claim hereinafter following.

What is claimed is:

In a caster device having complementary shell portions rotatably mounted relative to one another about a rotational axis inclined at an angle with respect to the supporting surface, the first portion being fixed against rotation about said axis and the second portion being rotatable about said axis and having a raised circumferential tread engageable with the floor surface, and an axle interconnecting the shell portions, the improvement comprising, the disposition of the rotational axis on an angle inclined approximately 20° from the supporting surface, a hub on the concave side of each of the shell portions, said hub presenting a bore of generally uniform cross-section terminating at an abutment, the axle having its opposite ends disposed in the respective bores against the abutments and being in complementary relationship therewith, one of the ends of the axle being knurled and press-fit into the bore of its shell portion subsequent to and independently of the fabrication of the shell portion, the other of the ends being of generally circular cross-section and disposed in rotatable fit within the bore of its shell portion and defining the rotational axis, said raised circumferential tread being a segment of a sphere having its center on the rotational axis and extending in width between its edges across an included angle of almost 40° symmetrically of a plane normal to the defined rotational axis through the engagement of the tread and the floor surface and means including a slip ring disposed in a recess on the other end of the axle and expandable to engage frictionally the respective hub for detachably securing the axle axially to the shell portion.

References Cited by the Examiner

UNITED STATES PATENTS 2,539,108 1/51 Shepherd.
2,940,781 6/60 Erikson _____ 301—111 X
3,040,371 6/62 Rice et al.

FOREIGN PATENTS 278,881 11/51 Switzerland.

DONLEY J. STOCKING, *Primary Examiner.*